United States Patent Office 3,427,189
Patented Feb. 11, 1969

3,427,189
RADIATION RESISTANT INSULATION
Habib Brechna, Palo Alto, Calif., assignor to the United States of America as represented by the United States Atomic Energy Commission
No Drawing. Filed Mar. 10, 1965, Ser. No. 438,798
U.S. Cl. 117—126                                3 Claims
Int. Cl. C03c 25/00; C09d 3/48; H01b 13/26

ABSTRACT OF THE DISCLOSURE

A high voltage insulation that is resistant to deterioration when subjected simultaneously to high levels of nuclear radiation, high temperatures and large mechanical stresses and which is comprised of fiber glass cloth uniformly impregnated with a thermosetting organic resin impregnant, such as an epoxy, polyester, or silicone resin, in which a large proportion of inorganic filler material, such as aluminum oxide, ground glass or mica, is suspended prior to impregnation of the cloth.

---

The present invention relates to electrical insulation materials and in particular, to an improved electrical insulation material capable of withstanding extreme heat and radiation conditions and the process for making same.

Electrical insulation for use under conditions of extreme radiation exposure have presented definite problems since the beginning of radiation studies such as those conducted in conjunction with high energy physics experiments. Due to the present trend towards bigger and higher energy accelerators, wherein energies are well over the one billion electron volt level with attendant increased magnetic, electrical, thermal, and particularly radiation exposure effects, there is a rising demand for an electrical insulating material capable of withstanding the combined environments of extremely high radiation levels and energies at elevated temperatures and with increased mechanical stresses. The use of radiation resistant insulation is particularly of interest in the construction of electromagnets wherein not only radiation effects but also elevated heat conditions have caused problems. For example, in the application of bending and focusing magnets for use in controlling the beam path of high energy electron beams, there exists the problem of heat generation and dissipation as well as that of the destructive effects of high energy beta and gamma radiation to the insulating materials utilized in the construction of the magnet coils. In the case of very high energy accelerators used in connection with time consuming physics experiments wherein down time must be kept to a minimum, breakdown of magnet insulations and/or associated electrical components due to radiation damage is costly and otherwise extremely undesirable. Irradiation effects on insulations are cumulative, permanent and persist even after the radiation field is removed. Irradiation causes changes in the insulation structure, which in time, can result in insulation failure due to magnetic, mechanical, and/or thermal stresses as well as due to application of high voltages thereacross.

At present, insulating materials used in conjunction with magnet coils have been various simple resin formulations including epoxies, polyesters or silicones impregnated glass fibers such as, for example, commonly known by the tradenames of Thermalastic, Orlithon, and Micatemp. Such materials do exhibit some resistance to heat and radiation and are utilized as insulation in temporary low energy installations. However, it was found in practice such materials could not be utilized in the construction of magnets in a permanent, high energy physics accelerator wherein the magnets must withstand the effects of high radiation exposure for the lifetime of the accelerator.

Accordingly, it is an object of the present invention to provide an improved electrical insulation material capable of withstanding relatively high radiation fields and temperatures over much longer periods of time than heretofore possible.

It is another object of the present invention to provide a heat and radiation resistant insulating material having a lifetime on the order of at least a hundred times longer than the lifetime of insulations heretofore known.

Still another object of the present invention is to provide a radiation resistant, electrical insulation material and the process for making same, which material is relatively economical to manufacture, and which is particularly well-suited as insulation in the construction of magnet coils.

Yet another object of the present invention is to provide a radiation resistant, insulation material and process for making same, utilizing predetermined proportions of glass cloth, organic binder materials, and inorganic filler materials, the proportions being combined under selected conditions.

Other objects and advantages will be apparent in the following description and claims.

The present invention comprises an electrical insulation composed mainly of organic impregnants mixed in combination with certain inorganic fillers to provide a mixture, which is then impregnated into an electrically-nonconductive support base, preferably glass fiber cloth, or similar sheet reinforcing material. Although the improved insulation material of the present invention is herein particularly described in the construction of magnet coils, such as those used in accelerators for directing the generated beams, it is to be understood that the material could be utilized wherever there is need for an electrical insulating material, and particularly where there is need for an insulation capable of withstanding extreme radiation conditions.

No adequate theory has been formulated to explain the superior performance of insulated structures fabricated utilizing the filler-binder compositions provided by the invention. Chemical reactions and the physical changes occurring in structures subjected to irradiation are complex and not subject to easy elucidation. Remarkable differences may be evidenced, for example, merely by varying radiation dosages by several orders of magnitude. Chain reactions including those initiated by free radicals are usually of importance in a system under irradiation. In some unexplained way the compositions of the invention remain stable and retain excellent insulating and physical properties for as long as several hundred times longer than prior art insulating compositions utilizing simple laminating or potting compositions hitherto available. It is considered, however, that the improved radiation resistance is imparted by relatively heavily increased loadings of particular filler materials as well as by certain operations which tend to degas and otherwise modify the compositions and structures.

Briefly, the process for the preparation of the insulation material comprises heating a selected organic thermosetting impregnant to about 60–80° C. in order to reduce its viscosity, and thereafter mixing the organic impregnant with the certain inorganic filler material until complete uniformity of the mixture is achieved. A satisfactory filler-binder mixture is achieved by adding approximately 100–120 parts by weight of the inorganic filler to 100 parts by weight of organic impregnant. Such proportions produce a preferred and optimum radiation resistant insulation as well as one adapted to the fabrication techniques used herein where different viscosities can be tolerated, e.g., in casting, about 80 to 150 parts of filler can be used. In addition, such proportions provide for ideal uniform distribution of the filler-binder mixture over the surface of the glass cloth or other glass fiber fabric when utilizing a suitable, fine mesh inorganic filler material. Catalysts selected as appropriate for polymerizing or otherwise setting up the organic impregnant composition, e.g., organic peroxides or alkaline agent, e.g., amines in the case of epoxy resins, etc., are used to cure the compositions. The catalyst also serves to reduce the viscosity of the resin temporarily. A thixotropic material may also be used to provide for the stable suspension of the filler material within the mixture. Inorganic fillers reduce mechanical properties of the mixture. Addition of wetting agents improves the mechanical properties of the mixture in excess of the pure organic compound. Upon preparation thereof, the mixture of inorganic filler and organic impregnant materials is applied to a suitable configuration of glass cloth under select conditions to form the insulation of the present invention. More particularly, when forming the insulation around the coils of a prospective magnet, the glass cloth is chemically treated and heated under preselected conditions before it is wrapped about the coil conductors, and thus prior to applying the mixture to the cloth to improve bonding.

To exemplify, in one of the processes for actual construction of the insulated coils of a magnet, the glass fiber cloth is chemically treated and heated as is further described infra, and is then wrapped around the bare conductors of the coil. The coil and glass cloth is then impregnated with the binder-filler mixture briefly described above within a selected vacuum environment. Upon being subjected to atmospheric pressure, the mixture is uniformly distributed into the fiber glass cloth to thereby preclude the existence of any unimpregnated open areas of the cloth. Moreover air is eliminated from the composition which may favorably increase radiation resistance. Also volatiles tend to be eliminated improving vacuum characteristics. The above mixture may be applied to the glass cloth and conductor by spraying or by brushing the mixture thereon. However, in such cases the conductor or coil is preferably subsequently subjected to heating and vacuum treatments in order to insure a uniform and complete distribution of the mixture relative to the glass cloth and conductor.

The organic binder utilized in the filler-binder mixture serves to unite the fabricated structure into one rigid unit, and as such holds the glass cloth, and thus the insulation, intimately to the conductor. The inorganic filler is generally in a particulate form, e.g., a powder, and serves to increase the viscosity of the mixture as well as contributing substantially to the radiation resistance of the composite structure. The reinforcing fabric can be any inorganic fibrous insulating material such as fiber glass material which is relatively unaffected by beta and gamma radiation which constitutes the principal radiations encountered in linear accelerators. The glass cloth utilized in accordance with the invention may be of tight, medium, or open weave depending on the type of insulation needed and degree of reinforcement needed.

One suitable fiber glass cloth utilized in accordance with the present invention is lime alumina borosilicate, relatively free of soda and is generally known in the art as E-glass. If a high strength glass cloth is desired, the type known as S-glass may be used. The glass cloth is perfectly elastic and follows Hookes law to rupture. Fibers stretch approximately 3.5% maximum before breaking. These characteristics as well as the mechanical, thermal, and electrical properties of glass fibers make such glass cloth very suitable for use as the basic coil insulation and to provide the support base for the insulation structure. As previously noted, and depending upon the type of insulation needed, glass cloths are available in an open, medium or a tight weave. Plain weave wherein the yarn alternates under and over, and leno weave wherein the two warp strands are twisted around each fill strand, are the types of weaves preferred over unidirectional or various other types of fiber weaves. However, oriented weave material can be used provided alternating layers are oriented at right angles or diagonally to yield desired ratios of tensile strength, etc.

The large ratio of surface area to volume makes the glass cloth sensitive to attack from chemicals, and the fiber surface has great affinity for water. In general, glass manufacturing processes make use of starch-oil finishes on the glass surface, which, if used in combination with organic resins, do not result in maximum bonding strength between resin and fiber. Therefore, in order to achieve maximum bonding strength in accordance with the present invention, the glass cloth is "heat cleaned" by continuous passage through an oven heated to approximately 570° C., or is "batch heat cleaned" in rolls heated similarly in air. In the latter case a maximum operating time-temperature of 24–48 hours at 360° C. is satisfactorily utilized to prevent development of too rapid exothermic heating in burning off the starch-oil size.

The tensile strength of fabrics is generally reduced 40–50% by heat cleaning. Therefore, in order to achieve maximum bonding to the resin, as well as to restore part of the loss in tensile strength due to heat cleaning, the glass cloth is chemically treated to provide what is known as a "surface finish" and/or by the chromadizing procedure by dipping in chromate solutions. The surface finish is applied by a dip or other processes and is dried at temperatures which remove the water or solvents. The best surface finishes used commercially are silanes and further resin types known, for example, by the tradenames of Volan, and Garan. The chemical treatment restores the tensile strength up to about approximately 75–80% of the original value. Chrome compound and silane chemical compounds associate themselves with the hydroxyl radicals of the glass, becoming firmly attached after the residual water is removed by drying. During subsequent laminating with an organic resin, organic groups on the surface will cross link to the active agents during the polymerization of the resins. To exemplify the above-noted surface finishing chemicals, Volan A is a chrome chloride complex (methacrylato chromic chloride) which is absorbed at about 0.13% by weight on the surface of the heat cleaned glass filaments of the fabric; and Garan is a vinylsilane complex (vinyltrichlorosilane).

Mica paper, which has for several years been used for electrical insulation, may be utilized in conjunction with the glass cloth for forming the supporting structure of the insulation. Small mica splittings, 0.1–4 millimeters large and 4 microns thick, are combined as a fleece, or ground mica is bonded to glass fiber fabric with an organic resin to provide a basic structure which can then be used to build up a laminated structure. Micapaper and micafleece have excellent electrical breakdown characteristics and their impregnation with organic resin is relatively simply accomplished. The various mica materials are applied and bonded to fiber glass cloth or fibertape with very little organic binder, for example on the order of 3%. Mica glass tapes are also available with B-staged resins, i.e., partially polymerized resin, with 25–30% binder by weight. If the tapes are dry, the overlapping parts between mica pieces produce voids, which allow easy impregnation with organic impregnants. In the case of dry tapes, 25% by volume voids can be expected due to the overlapping of the mica plates, which voids will be filled with the organic resin upon application thereof. In various wet tape tapes the binder is generally heated and, due to the decrease of viscosity, will flow uniformly over the tape to fill the voids and provide thus a uniform insulation around the conductor upon which the tape has been applied.

Several varieties of organic setting resins which may be utilized as the organic impregnants of above mention, in accordance with the present invention. For illustration, resins possessing the properties and processing conditions required herein are for example, epoxy resins, polyester resins and silicone resins, all of which belong to the so-called thermosetting type of organic resins. It will be appreciated that the foregoing epoxy and polyester resin types include the numerous copolymer and composite laminating resin mixtures. Such resins show excellent physical properties and are widely used in various special formulations as magnet coil potting and impregnation resins.

Epoxy resins are reaction products of epichlorohydrin with a diphenol component such as bisphenol-A. They are linear polymers which cross-link to form thermosetting resins by virtue of reactions with curing agents such as diamines or acid anhydrides. The epoxide group is opened by means of a condensation type reaction, and subsequently, a heavily cross-linked polymer structure is formed without evolution of volatile by-products. Epoxy resins have low polymerization volume shrinkage, e.g., 0.5–1.0%, and with no filler have low viscosity at impregnation temperatures of, for example, 50–100° C., as well as an ultimate tensile strength of approximately 900 kilograms/cm.$^2$ They likewise form an excellent adhesive bond to glass fiber. The pot life of epoxy resins can vary between 1 hour to several days. Epoxy resins may be formulated to cure at room temperature but those cured at high temperature generally show superior physical and radiation properties. The volume thermal expansion coefficient can be matched to the metallic conductor to which the epoxy is applied by incorporation with suitable inorganic mineral fillers. Cured epoxy resins are generally hard, tough, and chemically inert. The internal toughness and durability of epoxy resins give them superior fatigue performance as compared to unfilled polyester and silicone laminates. The temperature range in which unfilled epoxy resins may be operated continuously is $-100°$ C. to $+200°$ C. Filled epoxies have been used successfully up to 269° C. without damage.

Polyester resins are polybasic organic acids esterfied with polyalcohols. The most useful resins are of the rigid type, are unsaturated and are used as solutions in unsaturated monomers. Polyesters cured by additional polymerization do not give off volatile components during curing and do not require application of molding pressure as do phenolic resins. Such unsaturated polyesters have excellent physical properties in combination with coil insulation. Polyester resins used for potting are liquid, or for coil insulation are B-staged. They may be operated up to 200° C. The volume shrinkage of polyesters compared to that of epoxies is quite high, e.g., 5 to 8%. The high thermal expansion coefficient $(7-10 \times 10^{-4}$ cm./cm./per ° C.) of polyester can be reduced by the addition of mineral fillers. Post-curing improves their temperature resistance. Polyester resins have a rather short pot-life of minutes at impregnation temperatures of 60° C. At room temperature, the viscosity of polyesters is fairly high and makes difficult uniform impregnation of woven glass fabrics. Accordingly, specialized techniques are necessary to obtain suitable products.

Silicone resins is a term generally designating all organo-silicate materials, principally organo silanes ($SiH_4$ and derivatives) or organo-siloxanes ($R_nSiO_{4-n/2}$). Final polymerization is accomplished by condensation of the silanol groups. Silicone resins range from flexible to rigid plastics. For coil insulation in combination with glass fiber fabrics, the rigid type of silicone resin is preferred. The big advantage of slicones in insulation is the high retention of physical and electrical properties after prolonged exposure to temperatures of 200° C. and over, although they exhibit a somewhat lower mechanical strength. Additionally, silicones present attractive properties as regards resistance against corona, chemicals, moisture, and nuclear radiation.

Of a large array of small particle size inorganic fillers investigated for use in formulating the filler-binder of the present invention in combination with the organic impregnants, those found to perform particularly well are aluminum oxide, ground glass, zircon, zirconia, magnesium oxide, mica and silica, i.e., certain oxides and siliceous material. The preferred particle size for the above fillers is 10–20 microns, which is generally equivalent to a mesh size 900. The ability of a filler material to stay in suspension is related to its particle size and shape, its inherent density, the viscosity of the filled impregnant, and the pH of the system. Most fillers with 900 mesh size stay in suspension without the addition of thixotropic material. However, to provide optimum mixing of the combined materials as previously mentioned, a colloidal silica, i.e., a silica with organic compound treated surface, such as for example the material known by the trade name Cab-O-Sil, in the proportion of one to three parts per weight of the weight of the resin is added when making the mixture. The thixotropic material increases the viscosity of the mixture slightly, but retains the filler in suspension.

It is noted that the addition of mineral fillers to thermosetting resins such as epoxies, generally reduces the mechanical strength thereof. If it is desired to improve the mechanical strength of the resin system, a wetting or dispersing agent material such as for example, Dow-Corning Z-6040 (an epoxy functional material) may be added to the filler or to the resin system. To exemplify, the addition of Z-6040 in a concentration of 1 to 2 parts per weight of the epoxy improves the mechanical strength of mineral filled (silica) castings giving tensile strength in excess of that for unfilled mixtures.

Further details of the structures, compositions and methods of fabrication will be set forth in the following:

EXAMPLE I

Commercial resin preparation DER 332 LC and a mixture of MPDA and MDA as a hardener with an $Al_2O_3$ filler, 100–120 parts to 100 parts by weight of the DER 332 LC and hardener, and a thixotropic material, i.e., Cab-O-Sil 1 part per weight of the epoxy was used to prepare a filler-binder composition.

DER 332 LC is a diglycidyl ether of bisphenol A with an epoxide equivalent of 175. It has high purity, containing practically no aliphatic chains and a very low chlorine content in the glycidyl ether. Purity and particularly low chlorine content may be important in attaining radiation resistance since it is known that chlorine tends to produce longlived free radicals under irradiation and such might be a factor in degradation of the insulation. It frequently crystallizes at room temperature and warming to 60–70° C. restores the resin to a fluid state. MPDA is a mixture of very pure metaphenylene diamine and MDA is methylenedianiline. The mixture of MPDA and MDA is used as the hardener or curing agent for DER 332 LC, the mixture ratio being about 40–60 parts per weight, MPDA to MDA respectively. Eighteen to nineteen parts per weight of this curing agent were used per 100 parts of DER 332. The mixture should be prepared at about 60–65° C. The aromatic amine plasticizes the mixture making possible higher filler loading. The hardener decreases the viscosity of the mixtures compared with initial resin viscosity. An alumina filler loading of 100 parts per weight of the epoxy and hardener has a viscosity of approximately 850 cp. (centipoises) at 60° C. The addition of one part per weight of Cab-O-Sil to the epoxy system increases the viscosity to approximately 920 cp.; Cab-O-Sil is a colloidal silica prepared in a hot gaseous environment by a vapor-phase hydrolysis of a silicon compound. It functions as a thixotropic agent, as well as a thickening and gelling agent.

EXAMPLE II

Stycast 2850 FT is a modified and mineral-filled diglycidyl ether of bisphenol A with an epoxide equivalent weight of approximately 190. It has very little chlorine content in side chains and a high heat distortion temperature of 175° C. It is prepared with an alumina filler having an alumina content of approximately 130–140 parts per 100 parts by weight of 2850 FT. Due to the high viscosity of the system, Stycast 2850 FT can be used as a casting resin or for use in the wet-winding process described hereinafter. Heating it to 40° C. reduces the viscosity to 12,000 cp. At 60° C. its viscosity is still higher than 8000 cp. The curing agent to be used with Stycast 2850 FT is catalyst 11 in amount of approximately 4 parts per weight of the resin. Catalyst 11 is an aromatic amine eutectic with metaphenylene diamine as the major component.

EXAMPLE III

Glass fiber reinforced DER 332 and $BF_3MEA$, unfilled, and filled with $Al_2O_3$ 900-mesh in a concentration of 100–120 parts per 100 parts by weight of the epoxy system, and Cab-O-Sil 1 part per weight of epoxy. The compounds DER 332 and Cab-O-Sil noted in Example III are similar to those in Example I and are therefore not further defined herein. $BF_3MEA$ is classed as a Lewis acid and is boron trifluoride mono ethyl amine complex $BF_3(C_2H_5NH_2)$. The $BF_3$ content is 61%. Three parts per weight of $BF_3MEA$ were used per hundred parts of epoxy resin DER 332. A two-stage curing process was used consisting of precuring at 80° C. for 4 hours after fabrication, then post-curing at 160° C. for 12 hours. $BF_3MEA$ contains an aliphatic amine, but was used because of its unique features, such as yielding a long pot life of several days at room temperatures, and high heat distortion temperature of 149–180° C. Thus it may be used with a large number of different epoxies. It also has good chemical resistance and good electrical properties. The $BF_3MEA$ epoxy resin system cures on breakdown of the $BF_3$ complex, which begins to be significant in rate at about 80° C. A reduced $BF_3MEA$ level of one part per weight of epoxy may greatly extend the life of the binder on irradiation but requires a longer initial cure cycle. In general it is advisable to limit amine content of the compositions as much as curing properties permit.

EXAMPLE IV

Glass fiber reinforced DER 332 LC and Epon-Z, filled with $Al_2O_3$ 900-mesh 100 parts per 100 parts by weight of the DER 332 LC hardener system.

The material DER 332 LC has been described in Example I. Epon-Z is a modified aromatic polyamine and contains approximately 50 parts per weight of the total curing agent metaphynylene diamine (MPDA). The system cures by stoichiometric reaction between the amine and the epoxy resin until all primary and secondary amine hydrogens are used, at which point the amine still has the potential of curing epoxy catalytically as a tertiary amine. Seventeen to nineteen parts per weight of Epon-Z were used per hundred parts of DER 332 LC. Epon-Z is a liquid and may form crystals if stored at room temperature, wherefor slight warming is instituted prior to use to produce clear liquid. DER 332 and Epon-Z have a low viscosity of less than 100 cp. at casting temperature. Epon-Z has excellent chemical resistance, a high heat distortion temperature, and a moderate pot life of three hours at 45° C. Small castings are precured at 80° C. for two hours, and are postcured at 150° C. for two hours. Large castings and laminated structures should be gelled at room temperature and cured at 80°–100° C. for twelve hours.

EXAMPLE V

Glass fiber reinforced mixture of Epon 828 and 1031, filled with $Al_2O_3$ 900-mesh 100 parts per 100 part by weight of the Epon 828/1031 supplied by Shell Chemical Company.

A casting and impregnation solution of low viscosity and good handling properties is obtained by using a mixture of Epon 1031 and 828 with a ratio of 1:1. The mixture has a heat distortion temperature of 197° C. and a room temperature compressive strength of 1450 kg./cm.² Epon 1031 is a solid resin with high functionality and reactivity, and consists of a mixture of isomers and homologues. Due to difficult handling properties and high viscosity, it is blended with Epon 828. Epon 828 is a light-colored, epichorohydrin/bisphenol, A type, low molecular weight epoxy resin. The aromatic curing agent used with Epon 1031/828 was a mixture of nadic methylanhydride (NMA) and benzyl dimethylamine (BDMA). NMA with a concentration of 80 parts per weight, and BDMA, with a concentration of 0.5–1.0 part per 100 parts by weight of Epon 1031/828, were used as catalyst and accelerator. Pot life at room temperature was 10–12 hours. Initial curing was done at 60° C. for 2–4 hours; postcuring was done at 150° C. for 4–6 hours.

EXAMPLE VI

Glass fiber reinforced Eccoseal W19 and catalyst 11, filled wtih $Al_2O_3$ 900-mesh 100 parts per 100 parts by weight of Eccoseal W19, and Cab-O-Sil 1 part per weight of W19.

Eccoseal W19 is a basic resin system slightly different from Stycast 2850 FT. It is used in combination with catalyst 11. Sixteen to eighteen parts per 100 parts by weight of catalyst are used with W19. The viscosity of a W19 system at 60° C. is approximately 120 cp.; it is filled with a 100–120 parts by weight of $Al_2O_3$ and/or glass powder and MgO as a mineral filler and has radiation properties similar to Epon 828 and curing agent Epon-Z.

EXAMPLE VII

Glass filler reinforced R–7521 silicone and catalyst dicumyl peroxide with zircon powder filler (zorconium ortho silicate) 100 parts per 100 parts by weight of R–7521.

Silicone resin R–7521 combines a number of features that make it useful for coil insulation. At room temperature R–7521 has a viscosity of 135 cp., which decreases to about 80 cp. at 60° C. Filled and glass fiber reinforced R–7521 (cured) is hard and has a compression strength of approximately 1600 kg./cm.² R–7521 is mixed with recrystallized dicumyl peroxide as the curing agent. The proportions are 1.5 parts by weight hardener to 100 parts by weight of R–7521, and 0.25 part by weight accelerator N, dimethyl-p-toluidine, to 100 parts by weight of R–7521. 100 parts by weight of R–7521 is filled with 100 parts of zirconium ortho silicate, known by the trade name Ultrox, 15–20 microns grain size. The resin and filler may be supplied in the preparation of 100 to 900 parts per weight, or the amount of filler desired may be mixed into the resin. The pot life at 60° C. is greater than two weeks. The curing process takes six hours at 150° C.; then five hours at 250° C., and cures without evolution of volatile materials.

EXAMPLE VIII

Glass fiber reinforced and mineral filled mixture of DEN 438 and DER 332 LC.

A casting and impregnation mixture of low viscosity and good handling properties with high heat distortion temperature and excellent mechanical and thermal properties is obtained by a mixture ratio for DEN 438/DER 332 of 1/3 to 1/4 parts by weight.

There are various processes for forming the coils in accordance with the present invention. Briefly, in one process, the coils are wrapped with dry cloth and then impregnated with the prepared mixture of organic and inorganic materials under vacuum in closed molds or fixtures. Or, in another process, the prepared mixture of organic and inorganic materials is applied to the conductor and glass cloth while the conductors are being wrapped, and are thereafter placed into suitable molds for curing. The molds have laterally movable side walls to provide uniform pressure to all sides of the coil surfaces, while preventing the fluid resin from drainage during the curing period. The molds and coils are preheated to the resin impregnation temperature. The recommended applied vacuum is generally less than 1 millimeter of mercury. The best results, with epoxies for example, have been achieved at a vacuum of 400–600 microns. The resin systems are preheated to keep the viscosity down and are thoroughly degassed under vacuum prior to impregnation. In another technique termed a B-staged resin process, insulation tapes are first loaded with 25–35% resin by weight of composite insulation and kept refrigerated until they are used.

The impregnation of medium weave glass fiber under vacuum may cause the generation of voids, air pockets, and filtering out of the filler by the glass fiber. Often the space between the conductors will not be filled with the loaded resin, specifically because of the filtering effect of the fiber glass cloth which permits wetting with resins but holds the filler back. To achieve uniform impregnation and casting, the following impregnation methods utilizing the above-noted techniques, are described in greater detail.

Process I

In a process herein termed a wet-winding process, the conductors are first cleaned, for example with a mixture of acetone and trichloroethylene, sanded, and thereupon preheated to approximately 70° C. The alumina-filled epoxy or others of the various organic-inorganic mixtures described above, is degassed, preferably 15 minutes under 400–600 microns vacuum. The mixture is applied to the conductor surface by brushing or other means and simultaneously wrapped with medium or tight weave fiber glass cloth, (of the type 181). It is preferable that $Al_2O_3$ is used with 100–120 parts per weight of the epoxy mixture. In this case, generally the pot life of the applied epoxy may be relatively longer, for example, 24 to 36 hours. The need for a relatively longer pot life makes the use of the curing agent $BF_3MEA$ preferable. After wrapping, the coil is preferably heated to about 60° C. within a vacuum in order to achieve a more uniform distribution of the epoxy. The resin should not be allowed to cure. For the preparation of ground insulation, it is preferable to use microfleece in combination with the glass fiber cloth, which can be wet-wrapped around the coil using the alumina loaded epoxy. The coil is preferably then impregnated with pure DER 332 LC and the curing agent MPDA and MDA, and thereafter pressed to the required size during the curing period. Prior to any impregnation, the viscosity of the resin system is checked at impregnation temperature since a uniform casting is generally achieved when the impregnation is performed with systems having viscosities below 1500 cp. at the impregnation temperature of, for example, 60° C. Curing of the epoxies is generally done in two steps; precuring for 4–6 hours at 60° C., and post-curing 6 hours at 150° C.

Process II

In a second process herein termed a dry-winding process, the coils are first wound with dry, medium or tight weave fiber glass tape. The wrapped conductor is warmed to the temperature of the mixture, and placed within the mold. Impregnation is preferably conducted in a closed mold with no initial side pressure applied to the coils and within a vacuum environment, preferably with a mixture of DER 332 LC, alumina filled 100 parts by weight of the epoxy system using the curing agent MPDA/MDA. After impregnation, pressure is applied to the coil sides by means of the mold walls and the coil is precured. After a partial cure of the epoxy, a ground insulation (mica-loaded tight weave fiber glass tape) may be applied to the coil, and the coil is then impregnated under vacuum with DER 332 LC and curing agent MPDA and MDA. The curing of the epoxy preferably comprises the steps of precuring 4–6 hours at 60° C., and post-curing 6 hours at 150° C. The coil surface should be cleaned prior to the application of the ground insulation in order to guarantee a good bond between body and ground insulation.

Process III

In a third process, herein termed a B-staged process, the mixture of organic impregnant and inorganic filler is prepared as described above. Then the fiber glass tapes or cloth are loaded with from 25% to 35% of the impregnant-filler mixture by weight of the composite insulation and thereafter kept refrigerated until they are to be used. At such time, the conductors or coils are cleaned as per above-mentioned, and the loaded tapes are wrapped around the conductor, as well as around the pancaked coils which are formed of a seires of conductor layers. Mylar foils which exhibit a tendency to shrink at the curing temperature are wrapped around the outside of the insulation structure and the coil is placed between heated metal plates, such as those forming the above-mentioned molds or fixtures, and within a vacuum environment. The coil is pressed into final dimensions until the resin is cured. Heating and evacuation of the insulated coils prior to the pressure application by means of the walls, will improve the uniformity of the impregnation.

In general, glass fiber reinforced and mineral-filled epoxy show the highest radiation resistance compared to other organic resins. Likewise systems with the highest equivalent of epoxy to hardener ratios and pure aromatic amine hardener give the best results. An excess of epoxy stabilizes the system to degradation. Specific epoxy systems showing the best results were 100 parts DER 332 LC with 18 parts by weight of MDA and MPDA hardener. This system reinforced with medium weave fiber glass cloth and filled with powdered alumina retained 25–30% of its original mechanical properties at the absorbed radiation dose of $3 \times 10^{14}$ ergs gr.$^{-1}$. The glass fiber cloth (plain, medium or tight weave) is preferably heat cleaned and chemically treated (with Volan A or silanes) to achieve optimum bond to the epoxy system. It is advisable that at least 20–30% of the insulation volume be occupied by glass fiber. Preferred fillers for loading the organic resin are pure alumina particles, with a grain size of a maximum of 20 microns which is equivalent to 900-mesh size, silica, or ground glass.

The following are examples of insulation structure relative compositions:

| Conductor insulation: | Parts by weight |
| --- | --- |
| Organic resin system | 23–16 |
| Inorganic filler | 27–19 |
| Glass fiber cloth | 50–65 |
| Ground or main insulation: | |
| Organic resin | 17–20 |
| Inorganic filler | 13–15 |
| Micafleece | 45 |
| Glass fiber cloth | 25–20 |

If the use of mica is undesirable, the ground insulation will be the same as the conductor insulation.

To achieve castings that are as void-free as possible, the viscosity of the epoxy, curing agent, and filler system should preferably not exceed 1000 cp. at impregnation temperature. Vacuum impregnation gives the best results if performed in closed molds where a uniform pressure may be applied to the coil insulation after the impregnation. Additionally, if B-staged systems are used, the glass fiber should be loaded with the resin and the filler and it is preferable that the coil be evacuated after heat application.

DER 332 LC and hardener MPDA/MDA have a limited pot life and are therefore suitable for the impregnation of dry glass fibers under vacuum, but not as well suited for wet-winding large coils due to the increase of viscosity to approximately 50,000 cp. after being exposed to room temperature approximately 24 hours. If a long pot life of several days and less radiation resistance is preferable, DER 332 and hardener BF₃MEA are used. The mixture of the resin system with alumina filler and thixotropic material should be kept to viscosity values lower than 2000 cp. at 60° C.

In all the above-mentioned cases it is understood that the resin system contains a wetting agent, i.e., Z–6040, and if necessary a thixotropic agent such as colloidal silica.

While the invention has been disclosed with respect to several embodiments, it is apparent to those skilled in the art, that numerous variations and modifications may be made within the spirit and scope of the invention, and thus it is not intended to limit the invention except as defined in the following claims.

What is claimed is:

1. An electrical insulation that is resistant to deterioration when subjected simultaneously to high levels of nuclear radiation, high voltages, high levels of mechanical stress, and high temperatures, comprising:
   (a) an electrically non-conductive reinforcing fabric;
   (b) a thermosetting organic resin impregnant material; and
   (c) an inorganic filler suspended in said impregnant material, said filler having a grain size of the order of 10 to 20 microns and being in a proportion within a range of 100 to 130 parts by weight to 100 parts by weight of said organic impregnant material, said filler and impregnant material forming a mixture that is uniformly and completely impregnated into said cloth.

2. The insulation of claim 1 wherein said thermosetting resin material is a pure epoxy resin having the following properties, a high heat distortion temperature of from 150° to 220° C., a high equivalent weight of epoxy of the order of epoxy equivalent (EEW) 175–180, a low halogen content, all bond strengths within the lattice structure at least approaching equality, and curable with an aromatic amine.

3. The insulation of claim 1, wherein said fabric is glass fiber cloth and said insulation consists of 50–65 parts per weight of said cloth, 23–16 parts per weight of said impregnant material, and 27–19 parts of said filler.

References Cited
UNITED STATES PATENTS

| | | | |
|---|---|---|---|
| 2,656,290 | 10/1953 | Berberich et al. | 156—190 X |
| 2,757,298 | 7/1956 | Botts et al. | 156—188 X |
| 2,936,516 | 5/1960 | Adair | 161—93 X |
| 2,956,613 | 10/1960 | Edelman et al. | 174—121 X |
| 2,975,088 | 3/1961 | Rossman et al. | 174—120 X |
| 3,054,770 | 9/1962 | Rogers | 174—121 X |
| 3,192,309 | 6/1965 | Zoder et al. | 174—121 |
| 3,234,042 | 2/1966 | Marzocchi et al. | 117—126 |
| 3,254,150 | 5/1966 | Rogers | 174—121 X |

EARL M. BERGERT, *Primary Examiner.*

T. R. SAVOIE, *Assistant Examiner.*

U.S. Cl. X.R.

117—161; 156—53; 161—93; 175—121